US010162119B1

(12) United States Patent
Ho et al.

(10) Patent No.: US 10,162,119 B1
(45) Date of Patent: Dec. 25, 2018

(54) MICRO-BEAM SHAPING OPTICS (MBSO)

(71) Applicants: James G. Ho, Los Angeles, CA (US); Stuart McNaught, Redondo Beach, CA (US)

(72) Inventors: James G. Ho, Los Angeles, CA (US); Stuart McNaught, Redondo Beach, CA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 0 days.

(21) Appl. No.: 15/706,020

(22) Filed: Sep. 15, 2017

(51) Int. Cl.
 *G02B 6/30* (2006.01)
 *G02B 27/09* (2006.01)
 *G02B 6/26* (2006.01)

(52) U.S. Cl.
 CPC .............. *G02B 6/30* (2013.01); *G02B 6/262* (2013.01); *G02B 27/0927* (2013.01); *G02B 27/0983* (2013.01)

(58) Field of Classification Search
None
See application file for complete search history.

(56) References Cited

U.S. PATENT DOCUMENTS

| | | | |
|---|---|---|---|
| 5,729,306 A * | 3/1998 | Miyake | G02B 27/283 349/113 |
| 6,004,046 A * | 12/1999 | Sawada | G02B 6/4248 385/92 |
| 6,477,292 B1 | 11/2002 | Takahashi | |
| 6,711,318 B2 | 3/2004 | Hamerly et al. | |
| 6,906,849 B1 | 6/2005 | Mi et al. | |
| 6,956,687 B2 | 10/2005 | Moon et al. | |
| 7,250,317 B2 * | 7/2007 | Heideman | G02B 6/42 257/E21.483 |
| 7,535,620 B2 | 5/2009 | Zhou | |
| 8,417,078 B2 * | 4/2013 | Riester | G02B 6/138 385/47 |
| 8,665,506 B2 | 3/2014 | Moidu | |
| 8,723,102 B2 * | 5/2014 | Unterborsch | G02B 6/4214 250/227.11 |
| 2003/0081321 A1 | 5/2003 | Moon et al. | |
| 2003/0118288 A1 * | 6/2003 | Korenaga | G02B 6/42 385/49 |
| 2003/0184843 A1 | 10/2003 | Moon et al. | |
| 2005/0069253 A1 * | 3/2005 | Heideman | G02B 6/42 385/31 |
| 2008/0049292 A1 | 2/2008 | Matsuo et al. | |
| 2008/0217797 A1 | 9/2008 | Choi | |
| 2014/0072302 A1 * | 3/2014 | Iwama | H04Q 11/0005 398/48 |
| 2014/0286648 A1 * | 9/2014 | Buelow | G02B 6/2808 398/143 |
| 2015/0078748 A1 * | 3/2015 | Tazawa | G02B 6/356 398/48 |

* cited by examiner

*Primary Examiner* — Sung H Pak

(74) *Attorney, Agent, or Firm* — Tarolli, Sundheim, Covell & Tummino LLP

(57) ABSTRACT

An optical system can include an aligned fiber in optical communication with an optical medium. The optical system can also include a micro-mirror separated from an end of the aligned fiber by a first distance. The micro-mirror is positioned and shaped to transform light transmitted between the end of the aligned fiber and a target region of an integrated circuit (IC) chip. The micro-mirror is separated from the target region by a second distance the micro-mirror transforms an aspect ratio of a beam profile of the light.

18 Claims, 7 Drawing Sheets

MICRO-BEAM SHAPING OPTICS (MBSO)

TECHNICAL FIELD

The present disclosure relates to an apparatus for transmitting an optical signal.

BACKGROUND

In fiber-optic communication, a single-mode optical fiber (SMF) is an optical fiber designed to carry light directly down the fiber, in a transverse mode. Modes are the possible solutions of the Helmholtz equation for waves, which is obtained by combining Maxwell's equations and the boundary conditions. The modes define the way the wave travels through space, characterizing how the wave is distributed in space. Waves can have the same mode but have different frequencies. This is the case in SMFs, where a SMF can have waves with different frequencies, but of the same mode, indicating that that waves are distributed in space in the same way.

A multi-mode optical fiber (MMF) is a type of optical fiber mostly used for communication over short distances, such as within a building or on a campus. Typical multi-mode links have data rates of 10 Megabits per second (Mbps) to 10 Gigabits per second (Gbps) over link lengths of up to about 600 meters (2000 feet). Multi-mode fibers have a fairly large core diameter that enables multiple light modes to be propagated.

SUMMARY

One example relates to an optical system that includes an aligned fiber in optical communication with an optical medium. The system also includes a micro-mirror separated from an end of the aligned fiber by a first distance. The micro-mirror can be positioned and shaped to transform light transmitted between the end of the aligned fiber and a target region of an integrated circuit (IC) chip. The micro-mirror is separated from the target region by a second distance and the micro-mirror transforms an aspect ratio of a beam profile of the light.

Another example relates to a micro beam shaping optics (MBSO) assembly that includes a V-groove block that has a V-shaped groove extending along a first surface of the V-groove block and a beveled edge that extends between the first surface and a second surface at a given angle. An aligned fiber extends through a portion of the V-shaped groove. The MBSO also includes a mirror block adhered to the beveled edge of the V-groove block. The mirror block includes a micro-mirror spaced from an end of the aligned fiber by a first distance. The given angle separates an imaginary line extending normal to a center of the micro-mirror and an imaginary line that extends along a center of the aligned fiber.

Yet another example relates to an optical system that includes a fiber optic cable and an IC chip with a target region. The optical system also includes a MBSO assembly affixed to a surface of the IC chip. The MBSO includes an aligned fiber that extends substantially in parallel to the surface of the IC chip and the aligned fiber being optically coupled to the fiber optic cable. The MBSO changes a length to width ratio of optical signals transmitted between the fiber optic cable and the target region of the IC chip.

DETAILED DESCRIPTION

This disclosure relates to an optical system with a micro beam shaping optics (MBSO) assembly that can transform a single mode optical beam shape (nominally Gaussian) to a narrow line focus (e.g., an ellipsoid or double-bulbous shape) with nearly uniform intensity distribution. The MBSO assembly can be employed to transmit optical signals to (or receive optical signals from) a target region on an integrated circuit (IC) chip with high power efficiency and a small footprint. The MBSO assembly can be fabricated with dielectric (non-metal) materials. Thus, the MBSO assembly minimizes disturbance to surrounding electronic devices.

Figure 1:
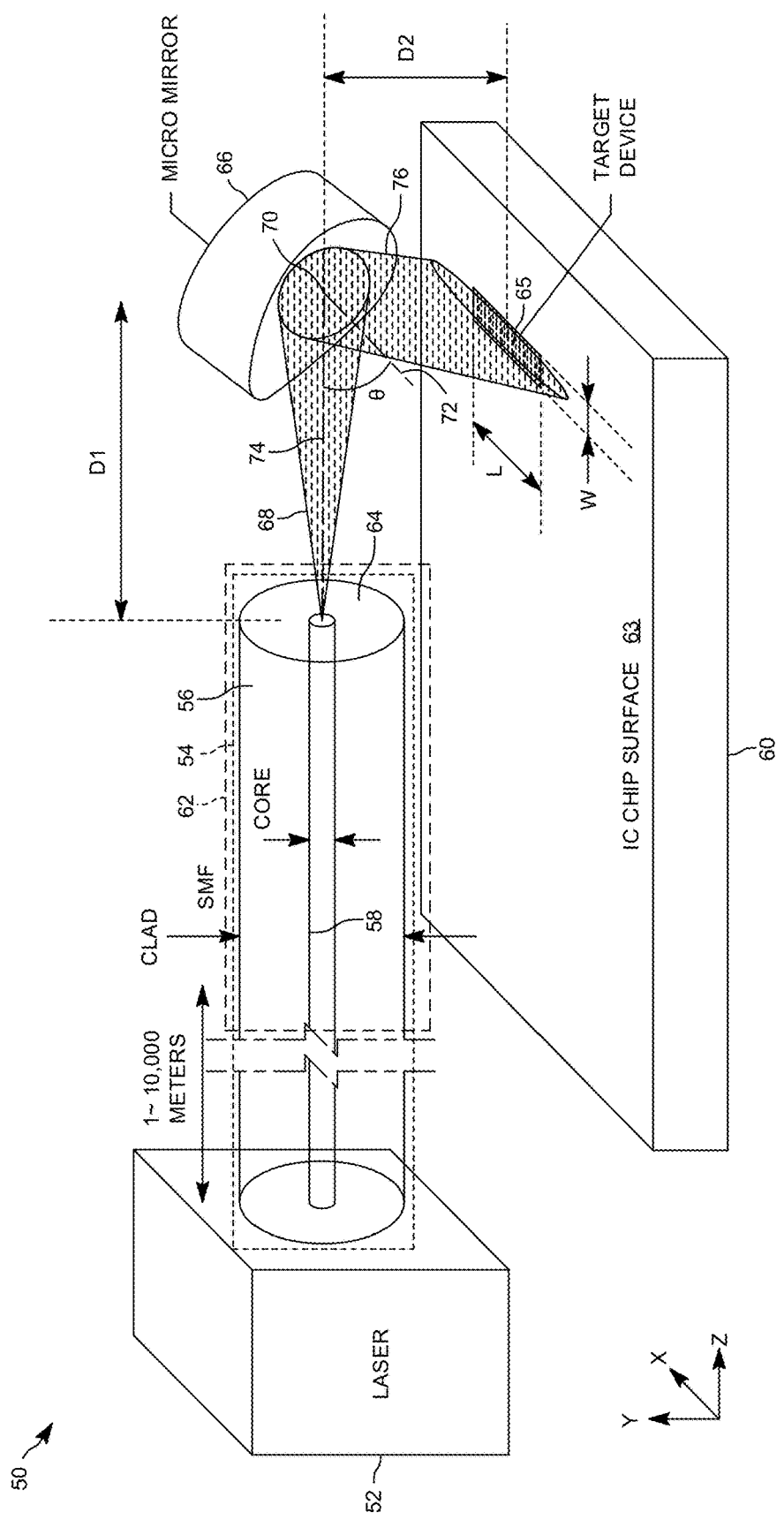
FIG. 1 illustrates an example of an optical system.

FIG. 1 illustrates an optical system 50 transmitting an optical signal. The optical system 50 includes a laser 52 that generates the optical signal that is transmitted through an optical medium 54. The optical medium 54 includes a single mode optical fiber (SMF). The optical medium 54 includes a cladding 56 that encases a core 58. The core 58 has a higher index of refraction than the cladding 56. Accordingly, the optical signal propagates through the core 58 along a length of the optical medium 54.

A portion of the optical medium 54 can be formed with a fiber optic cable. Thus, the optical medium 54 has a length that ranges from less than about 1 meter (m) to about 10 kilometers (km) or more. The optical medium 54 may have turns throughout the length. The optical medium 54 overlays an integrated circuit (IC) chip 60 that may be adhered to a printed wire board (PWB) (not shown). The IC chip 60 includes a surface 63 (e.g., a top surface) that has a rectangular shape. In other examples, the surface 63 of the IC chip 60 can be a different shape. The optical medium 54 has an aligned fiber 62 that extends parallel to the surface 63 of the IC chip 60. In some examples, the aligned fiber 62 can be a rigid portion (a rigid fiber) of the optical medium 54. In some examples, as explained herein the aligned fiber 62 is housed in a micro beam shaping optics (MBSO) assembly. In other examples, the aligned fiber 62 of the optical medium 54 is adhered to the surface 63 of the IC chip 60.

The IC chip 60 includes a target region 65 that is configured to receive the optical signal. The target region 65 is implemented as a photosensitive and/or photo-emitting region of the IC chip 60. In one example, intensity of an optical signal applied to the target region 65 changes a resistivity of a circuit internal to the IC chip 60. In another example, the target region 65 is coupled to an input node of a phototransistor or an intrinsic region of a photodiode. It is understood that the IC chip 60 can be implemented as nearly any type of IC chip with a photosensitive and/or photo-emitting region.

An end 64 of the aligned fiber 62 of the optical medium 54 that is distal to the laser 52 forms an interface that is exposed to free space and is directed to a micro-mirror 66. A conical light beam 68 formed of the optical signal traversing the optical medium 54 exits the optical medium 54 at the end 64 of the aligned fiber 62 that is proximal to the micro-mirror 66.

Figure 2:
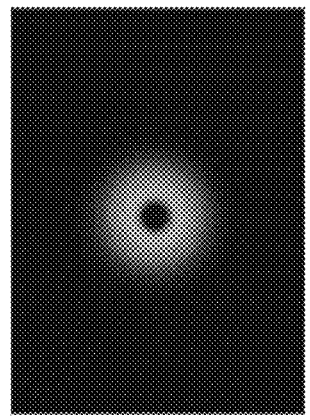
FIG. 2 illustrates an example of a light beam profile at an end of an aligned fiber illustrated in FIG. 1.

FIG. 2 illustrates an example of a light beam profile 100 corresponding to the conical light beam 68 upon exit from the end 64 of the aligned fiber 62. As illustrated, the light beam profile 100 is formed of concentric circles, with a center having a highest light intensity, and an outer circle having a lowest light intensity.

Referring back to FIG. 1, the micro-mirror 66 can be formed of nearly any reflective material, including, but not limited to a highly reflective (HR) coating applied to a silicon wafer. The micro-mirror 66 is a concave mirror that receives the conical light beam 68 centered (or nearly centered) on a center 70 of the micro-mirror 66. In some examples, the micro-mirror 66 is implemented as a spherical mirror. In other examples, the micro-mirror 66 may have a different shape, such as an ellipsoid or cylindrical shape. The aligned fiber 62 of the optical medium 54 and the micro-mirror 66 are oriented such that an imaginary line 72 that is normal to the center 70 of the micro-mirror 66 and an imaginary line 74 that extends through the center of the core 58 of the optical medium 54 are separated by a given angle, θ. Additionally, the end 64 of the optical medium 54 and the center 70 of the micro-mirror 66 are separated by a distance of D1.

Figure 3:
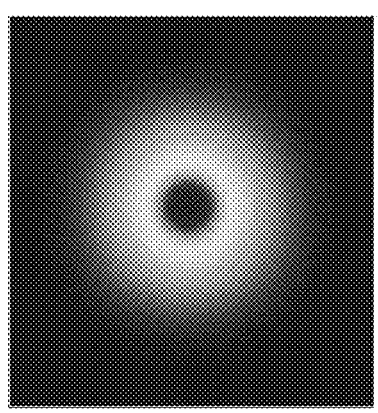
FIG. 3 illustrates an example of a light beam profile near a micro-mirror illustrated in FIG. 1.

FIG. 3 illustrates an example of a light beam profile 120 corresponding to the conical light beam 68 upon contacting the micro-mirror 66. As illustrated, the light beam profile 120 is formed of concentric circles with a center having a highest light intensity, and an outer circle having a lowest light intensity. Additionally, relative to the light beam profile 100 of FIG. 2, the light beam profile 120 has an increased divergence (spread).

Referring back to FIG. 1, the center 70 of the micro-mirror 66 and the target region 65 are separated by a distance of D2. The micro-mirror 66 reflects and transforms (e.g., through distortion) the conical light beam 68 to form an elliptical light beam 76. That is, the micro-mirror 66 changes an aspect ratio (length to width ratio) of the conical light beam 68 to form the elliptical light beam 76. The elliptical light beam 76 is applied on the target region 65 of the IC chip 60.

Figure 4:
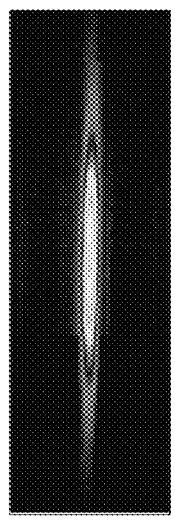
FIG. 4 illustrates an example of a light beam profile near a target region of an integrated circuit (IC) chip illustrated in FIG. 1.

FIG. 4 illustrates an example of a light beam profile 140 corresponding to the elliptical light beam 76, such as light near the target region 65. As illustrated, the light beam profile 140 is formed of concentric ellipses with a center ellipse having a highest light intensity, and an outer ellipse having a lowest light intensity.

Referring back to FIG. 1, the distance, D1 between the end 64 of the aligned fiber 62 of the optical medium 54 and the center 70 of the micro-mirror 66, can range from about 500 to about 1000 micrometers (μm). Additionally, the distance, D2 between the target region 65 and the center 70 of the micro-mirror 66 can range from about 100 μm to about 1000 μm. Furthermore, the given angle, θ between the imaginary line 72 normal to the center 70 of the micro-mirror 66 and the imaginary line 74 extending along the center of the optical medium 54 can be in a range of about 20 degrees (°) to about 70°. In one example, it is presumed that the distances D1 and D2 are about 500 μm and the given angle, θ is about 45°.

In such a situation, a width, W of the elliptical light beam 76 that reaches the IC chip surface 63 is less than about one-half (½) of a diameter of the core 58 of the optical medium 54. For example, the width, W of the elliptical light beam 76 may be less than about 2 μm if the core 58 has a diameter of about 5 μm. Moreover, a length, L of the elliptical light beam can be between about 20 and about 40 times larger than the width, W. In some examples, the target region 65 has about the same width and length as the elliptical light beam 76. Further, the aspect ratio between the length, L and the width, W change as a function of the distances, D1, D2 and the given angle, θ.

Additionally, the optical system 50 could be modified to operate in reverse. For instance, in an example where the target region 65 emits light with the same or similar parameters as the elliptical light beam 76, the micro-mirror 66 transforms the elliptical light beam 76 to form the conical light beam 68 that is transmitted through the core 58 of the optical medium 54 and to the laser 52. In such a situation, the laser 52 can include (or be replaced with) a light detecting device to detect light propagating through the optical medium 54.

By employment of the optical system 50, a light beam with a tightly controlled and small footprint can be applied to (or received from) the target region 65. Accordingly, the optical system 50 can be fabricated in a compact environment. Additionally, as illustrated in FIG. 4, the resultant elliptical light beam 76 has nearly a uniform intensity across the target region 65. Moreover, the small footprint of the elliptical light beam 76 reduces the amount of light lost during transmission, thereby increasing power efficiency.

Figure 5:
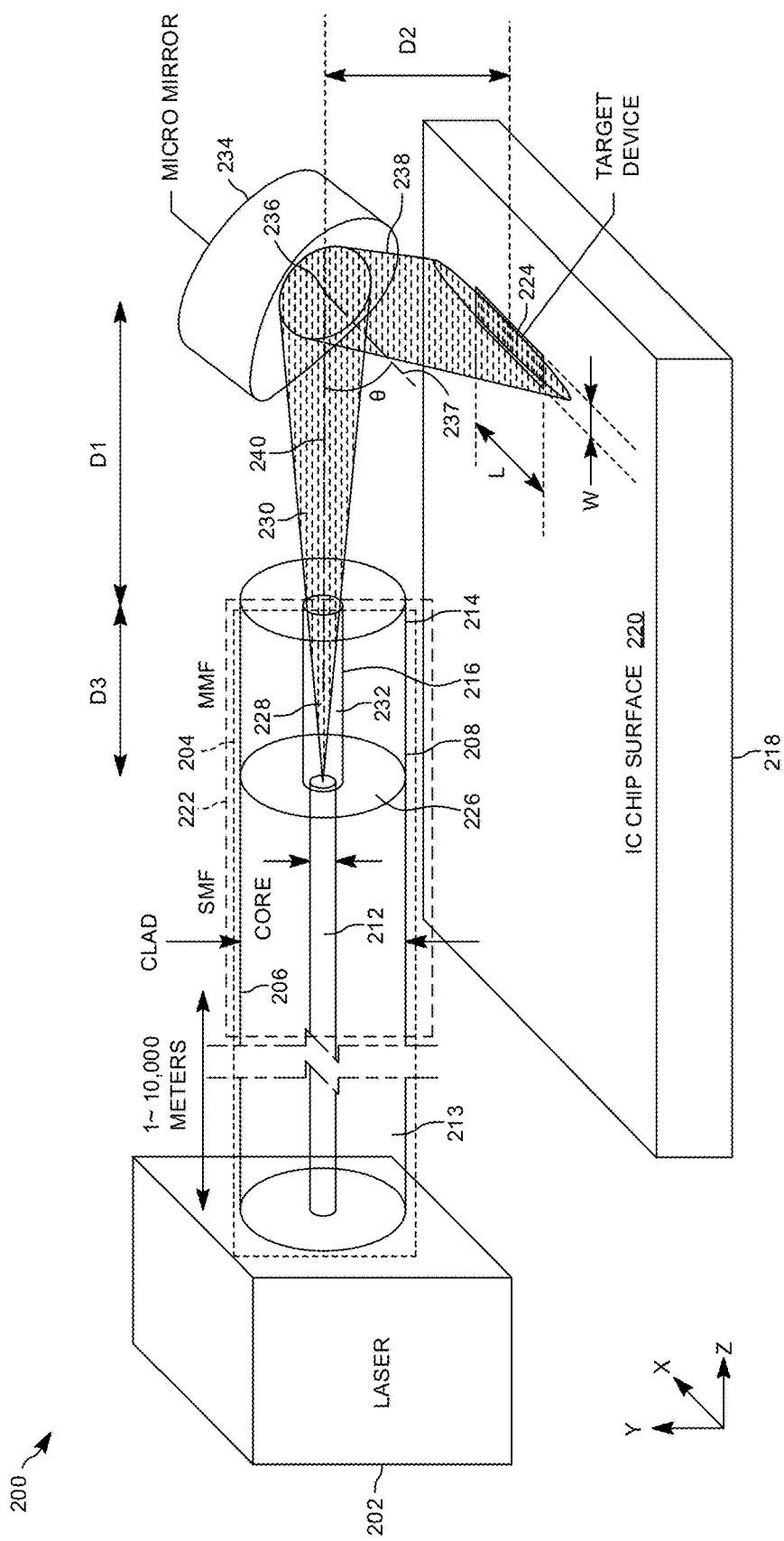
FIG. 5 illustrates another example of an optical system.

FIG. 5 illustrates another example of an optical system 200 applying an optical signal. The optical system 200 includes a laser 202 that generates the optical signal that is transmitted through an optical medium 204. The optical medium 204 includes a SMF portion 206 and a multi-mode fiber (MMF) portion 208 that are joined by splicing and/or another technique. The SMF portion 206 includes an SMF cladding 210 that encases an SMF core 212. The SMF core 212 has a higher index of refraction than the SMF cladding 213. Accordingly, the optical signal propagates through the SMF core 212 along a length of the SMF portion 206. Similarly, the MMF portion 208 includes an MMF cladding 214 that encases an MMF core 216. The MMF core 216 has a diameter that is at least about twice the diameter of the SMF core 212.

The SMF portion 206 of the optical medium 204 has a length that ranges from less than about 1 meter (m) to about 10 kilometers (km) or more and the MMF portion 208 has a length of about 3 millimeters (mm) or less. The SMF portion 206 optical medium 204 may have turns throughout the length. The optical medium 204 overlays an IC chip 218 that may be adhered to a PWB (not shown). The IC chip 218 includes a surface 220 (e.g., a top surface) that has a rectangular shape. In other examples, the surface 220 of the IC chip 218 can be a different shape. The optical medium 204 has an aligned fiber 222 that extends parallel to the surface 220 of the IC chip 218. The aligned fiber 222 includes the MMF portion 208 and a section of the SMF portion 206. The MMF portion 208 is positioned at an end of the aligned fiber 222 that is distal to the laser 202.

In some examples, as explained herein the aligned fiber 222 is housed in an MBSO assembly. In other examples, the aligned fiber 222 of the optical medium 204 is adhered to the surface 220 of the IC chip 218.

The IC chip 218 includes a target region 224 that is configured to receive the optical signal. The target region 224 is implemented as a photosensitive (or photo-emitting) region of the IC chip 218. It is understood that the IC chip 218 can be implemented as nearly any type of IC chip with a photosensitive (or photo-emitting) region.

An end 226 of the SMF portion 206 that interfaces with the MMF portion 208 provides a conical light beam 228 that is propagated through the MMF core 216. In some examples, the conical light beam 228 has a profile with a similar shape as the laser profile 100 illustrated in FIG. 2. Moreover, the MMF portion 208 transforms the conical light beam 228 to form a ring-shaped light beam 230 that exits the aligned fiber 222 formed at the end 232 of the MMF portion 208 that is distal to the laser 202 and proximal to the micro-mirror 234. The end 232 can be formed by cleaving the MMF portion 208. The end 232 forms an interface that is exposed to free space and is directed to a micro-mirror 234. A ring-shaped light beam 230 formed of the optical signal traversing the MMF portion 208 exits the optical medium 204 at the end 232 of the aligned fiber 222 that is proximal to the micro-mirror 234.

Figure 6:
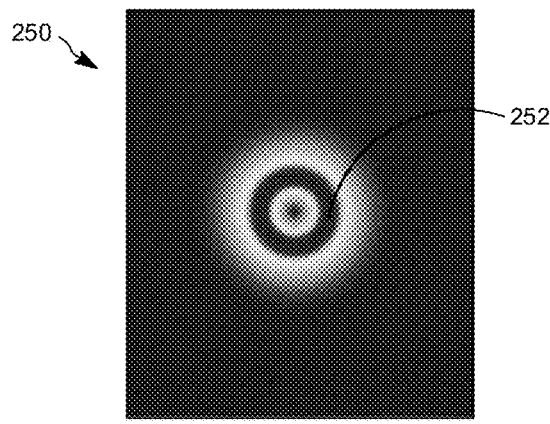
FIG. 6 illustrates an example of a light beam profile at an end of an aligned fiber illustrated in FIG. 5.

FIG. 6 illustrates an example of a light beam profile 250 corresponding to the ring-shaped light beam 230 upon exit from the end 232 of the MMF portion 208. As illustrated, the light beam profile 250 is formed of a ring 252 where light intensity is greatest. Moreover, concentric circles that surround the ring 252 and the concentric circle that are encompassed within the ring 252 (e.g., a center of the ring 252) have a lower light intensity than the ring 252. As an alternative naming convention, the light beam profile 250 may be described as being "doughnut shaped".

Referring back to FIG. 5, the micro-mirror 234 can be formed of nearly any reflective material, including, but not limited to a highly reflective (HR) coating applied to a silicon wafer. The micro-mirror 234 is a concave mirror that receives the ring-shaped light beam 230 centered (or nearly centered) on a center 236 of the micro-mirror 234. In some examples, the micro-mirror 234 is implemented as a spherical mirror. In other examples, the micro-mirror 234 may have different shape, such as an ellipsoid or cylindrical shape. The aligned fiber 222 of the optical medium 204 and the micro-mirror 234 are oriented such that an imaginary line 237 that is normal to the center 236 of the micro-mirror 234 and an imaginary line 240 that extends through the center of the MMF core 216 of the optical medium 54 are separated by a given angle, θ. Additionally, the end 232 of the MMF portion 208 the center 236 of the micro-mirror 234 are separated by a distance of D1.

Figure 7:
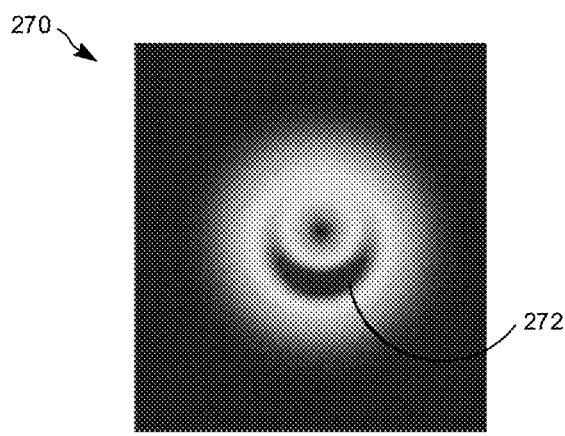
FIG. 7 illustrates an example of a light beam profile near a micro-mirror illustrated in FIG. 5.

The portion of the ring-shaped light beam 230 that is projected onto the micro-mirror 234 is transformed. In particular, FIG. 7 illustrates an example of a light beam profile 270 corresponding to the ring-shaped light beam 230 upon contacting the micro-mirror 234. As illustrated, the light beam profile 270 is formed of a crescent 272 having a greatest intensity of light. Regions of the light beam profile 270 away from the crescent 272 have a lower intensity of light.

Referring back to FIG. 5, the center 236 of the micro-mirror 234 and the target region 224 are separated by a distance of D2. The micro-mirror 234 changes a shape and aspect ratio (e.g., length to width ratio) of the ring-shaped light beam 230. More particularly, the micro-mirror 234 reflects and transforms the ring-shaped light beam 230 to form a double bulbous shaped ("dumbbell shaped") light beam 238. The double bulbous shaped light beam 238 is projected onto the target region 224.

Figure 8:
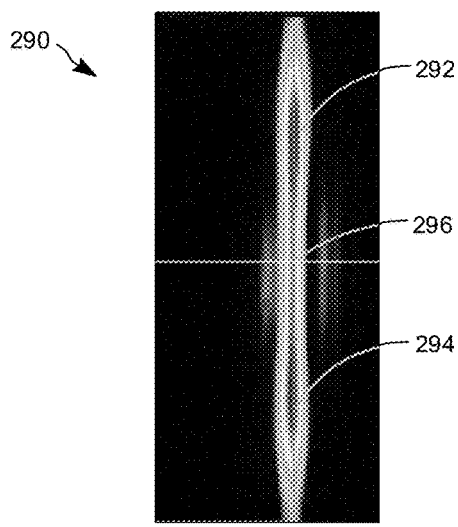
FIG. 8 illustrates an example of a light beam profile near a target region of an IC chip illustrated in FIG. 5.

FIG. 8 illustrates a light beam profile 290 corresponding to the double bulbous shaped light beam 238. As illustrated, the light beam profile 290 include a first bulbous shaped region 292 and a second bulbous shaped region 294 that are separated by a narrow region 296. In the light beam profile 290, a center region of the first bulbous region 292, the second bulbous region 294 and the narrow region 296 have a greatest light intensity. Moreover, regions surrounding the first bulbous region 292, the second bulbous region 294 and the narrow region 296 have a lower light intensity.

Referring back to FIG. 5, the distance, D1 between the end 232 of the MMF portion 208 of the optical medium 204 and the center 236 of the micro-mirror 234, can range from about 100 μm to about 1000 micrometers (μm). Additionally, the distance, D2 between the target region 224 and the center 236 of the micro-mirror 234 can range from about 100 μm to about 1000 μm. Furthermore, the given angle, θ between the imaginary line 237 normal to the center 236 of the micro-mirror 234 and the imaginary line 240 extending along the center of the MMF core 216 can be in a range of about 20° to about 70°. In one example, it is presumed that the distances D1 and D2 are about 500 μm and the given angle, θ is about 45°. Additionally, the length of the MMF portion 208 is a distance, D3, which (as noted) is about 3 mm or less.

In such a situation, a width, W of the double bulbous shaped light beam 238 that reaches the IC chip surface 220 is less than about one-half (½) of a diameter of the SMF core 212 of the optical medium 204. For example, the width, W of the double bulbous shaped light beam 238 may be less than about 2 μm if the SMF core 212 has a diameter of about 5 μm. Moreover, a length, L of the double bulbous shaped light beam 238 can be between about 20 and about 40 times larger than the width, W. In some examples, the target region 224 has about the same width and length as the double bulbous shaped light beam 238. Further, the ratio between the length, L and the width, W changes as a function of the distances, D1, D2 and the given angle, θ.

Additionally, the optical system 200 could be modified to operate in reverse. For instance, in an example where the target region 224 emits light with the same or similar parameters as the double bulbous shaped light beam 238, the micro-mirror 234 transforms and reflects the light that is transmitted from the target region to the MMF core 216, to the SMF core 212 of the optical medium 204 and to the laser 202. In such a situation, the laser 202 can include (or be replaced with) a light detecting device to detect light propagating in the optical medium 104.

By employment of the optical system 200, a light beam with a tightly controlled and small footprint can be applied to (or received from) the target region 224. Accordingly, the optical system 200 can be fabricated in a compact environment. Additionally, the small footprint of the double bulbous shaped light beam 238 reduces the amount of light lost during transmission, thereby increasing power efficiency.

Figure 9:
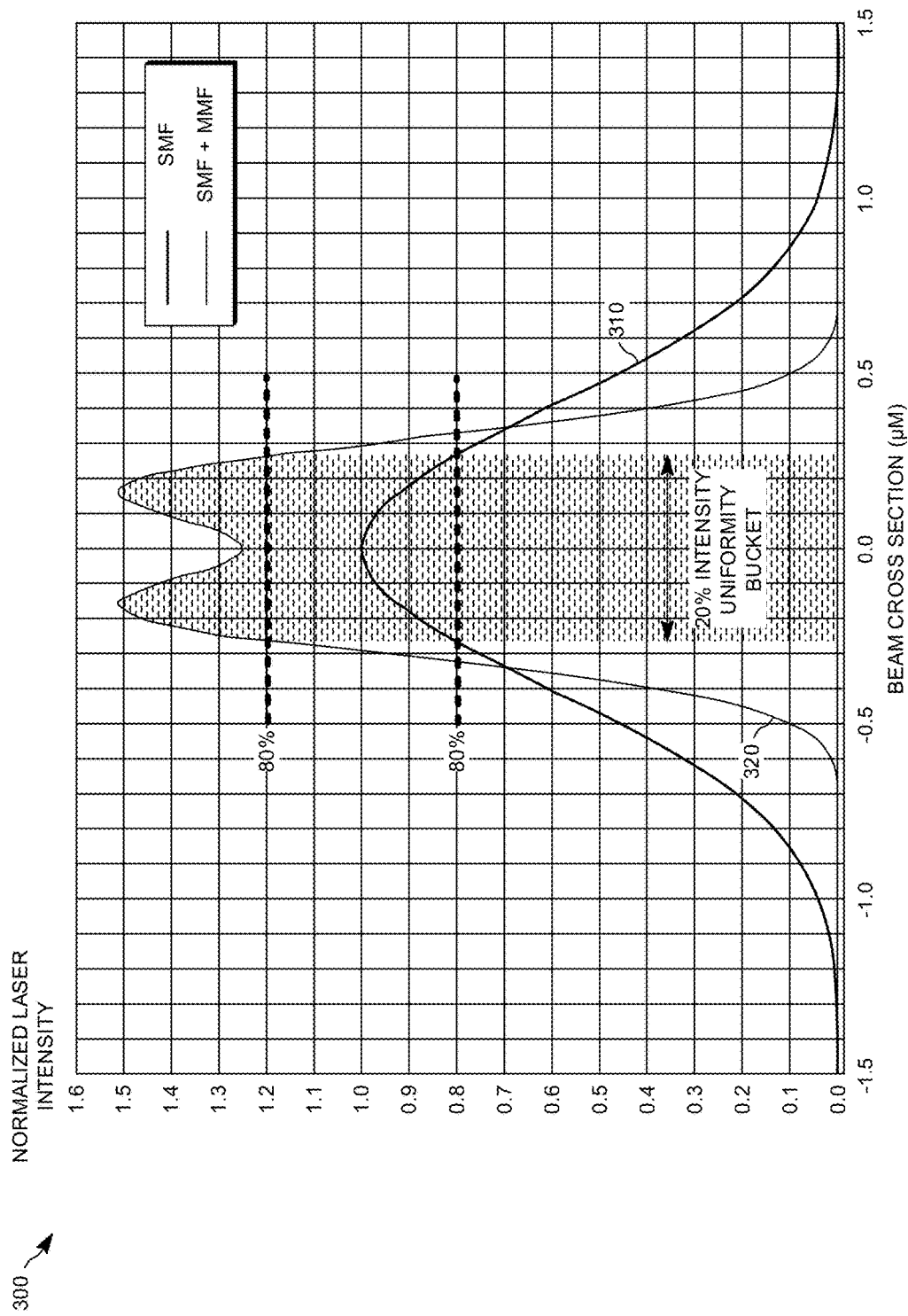
FIG. 9 illustrates a chart that plots a normalized light beam intensity as a function of distance from a center of a beam cross section.

FIG. 9 illustrates a graph 300 that plots a normalized (unit-less) laser intensity as a function of a cross section of a laser beam projected on a target region in micrometers (μm). The graph 300 includes a plot 310 that characterizes the normalized laser intensity of the light beam profile 140 (for a given input light intensity) illustrated in FIG. 4, which represents the laser beam projected by the optical medium 54 formed of an SMF, as described with respect to FIG. 1. As illustrated in the plot 310 light intensity peaks (about 1.0 μm) at a center (0.0) of the projected laser beam. Moreover, as illustrated by the plot 310, the light intensity is at least 80% of the peak light intensity between within about 2.5 μm of the center of the projected laser beam, which defines boundaries of a "power in bucket" (PiB) region for the projected laser beam. As demonstrated by the plot 310, about 50% of the total power projected by the laser beam (illustrated in FIG. 4) falls in the PiB region.

Additionally, the graph 300 includes a plot 320 that characterizes the normalized laser intensity of a the light beam profile 190 (for the given input light intensity) illustrated in FIG. 8, which represents the laser beam projected by the optical medium 204 formed with an SMF portion 206 and an MMF portion 208. As illustrated by the plot 320, a light intensity peaks (twice) at about 1.5 at about 1.5 μm from the center (at 0.0). Additionally, as illustrated by the plot 320, the light intensity is at least 80% of the peak light intensity within about 2.5 μm of the center of the projected laser beam to define boundaries of the PiB region. As demonstrated by the plot 320, about 75% of the total power projected by the laser beam (illustrated in FIG. 8) falls in the PiB region. As illustrated in comparison of plots 310 and 320, further power efficiency is achievable by inclusion of an MMF portion (the MMF portion 208 of FIG. 5) on an optical medium.

Figure 10:
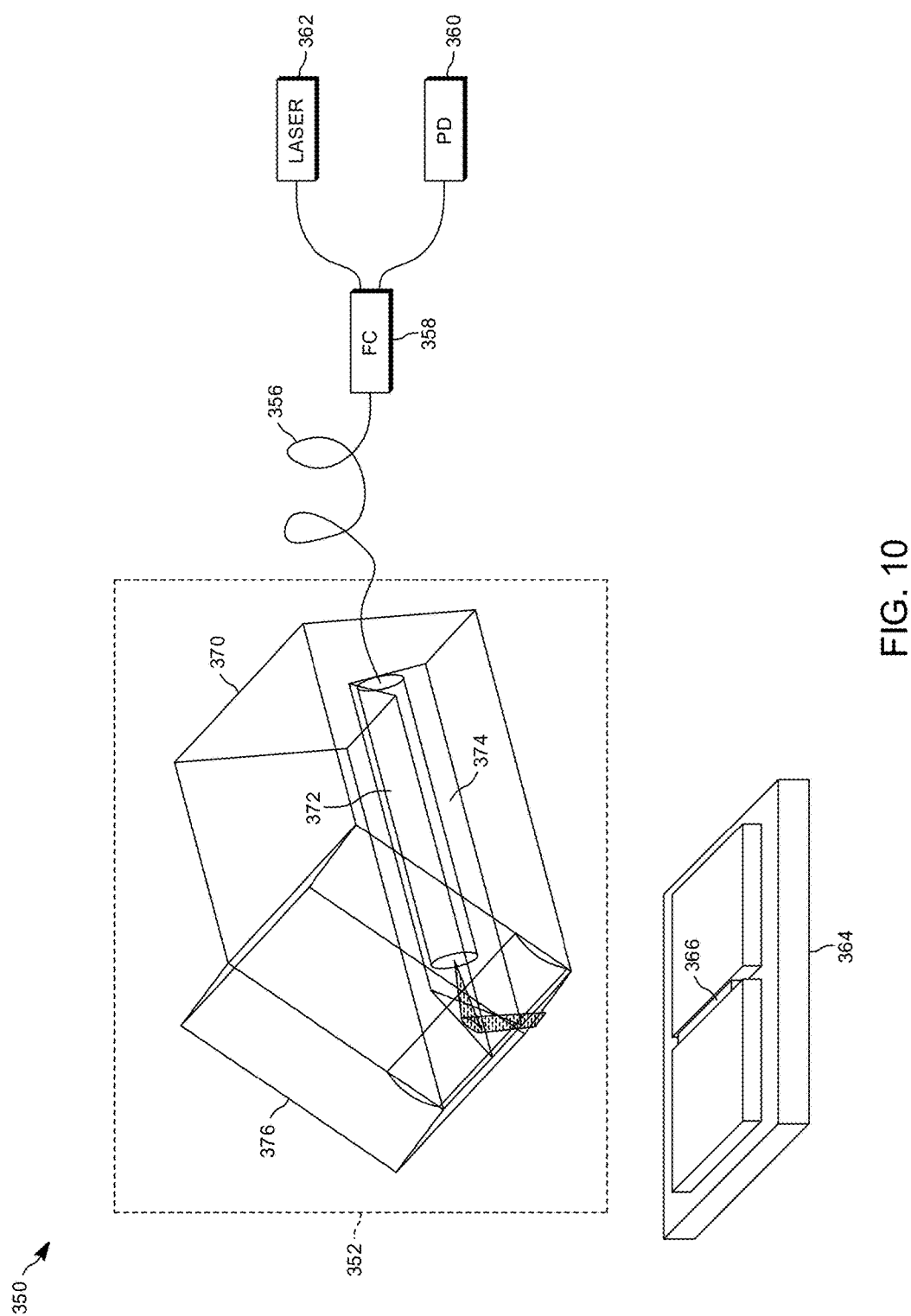
FIG. 10 illustrates an example of an optical system that includes a micro beam shaping optics (MBSO) assembly.

FIG. 10 illustrates an optical system 350 that could be employed to implement the optical system 50 of FIG. 1 and/or the optical system 200 of FIG. 5. The system includes an MBSO assembly 352 (Micro Beam Shaping Optics) assembly that can house an aligned fiber of an optical medium, such as the aligned fiber 62 of FIG. 1 and/or the aligned fiber 222 of FIG. 5. Additionally, the MBSO assembly 352 can house a micro-mirror such as the micro-mirror 66 of FIG. 1 and/or the micro-mirror 234 of FIG. 5. The MBSO assembly 352 can be formed with dielectric materials (e.g., non-metal materials).

The MBSO assembly 352 receives and/or transmits an optical signal on a fiber optic cable 356, which is formed of a SMF. The fiber optic cable 356 is coupled to a fiber coupler 358 that provides optical signals transmitted from the MBSO assembly 352 to a photodetector 360. Additionally, the photo coupler 358 applies (directs) optical signals input by a laser 362 to the fiber optic cable 356, which are transmitted to the MBSO assembly 352.

Figure 11:
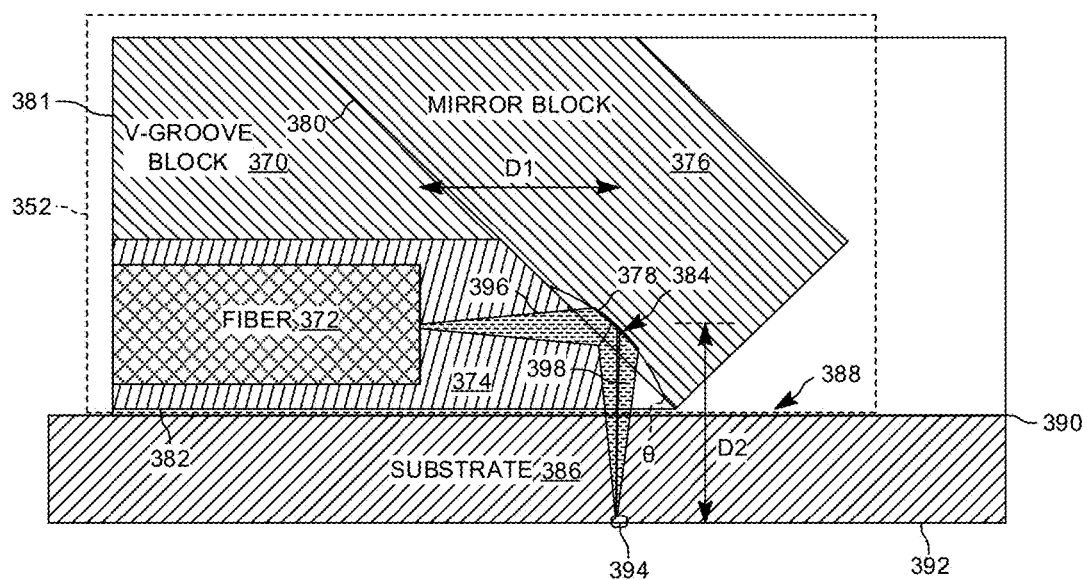
FIG. 11 illustrates a cross-sectional view of the MBSO assembly illustrated in FIG. 10.

The MBSO assembly 352 is configured to be mounted on an IC chip 364. In particular, the MBSO assembly 352 is designed/fabricated to guide optical signals transmitted between a target region 366 of the IC chip 364 and the fiber optic cable 356. FIG. 11 illustrates a cross sectional view of the MBSO assembly 352 illustrated in FIG. 10 mounted on the IC chip 364. For purposes of simplification of explanation, the same reference numbers are employed in FIGS. 10 and 11 to denote the same structure.

The MBSO assembly 352 includes a V-groove block 370 that aligns an optical fiber 372 (an aligned fiber) that is in optical communication with the fiber optic cable 356. The V-groove block 370 includes an elongated V-shaped recess 374 that seats and aligns the aligned fiber 372. The aligned fiber 372 can implement the aligned fiber 62 of FIG. 1 and/or the aligned fiber 222 of FIG. 5.

The MBSO assembly 352 also includes a mirror block 376 adhered/fused to the V-groove block 370. The V-groove block 370 has a beveled edge 380 that extends between a first surface 381 and a second surface 382 at a given angle, θ. In some examples, the given angle, θ is in a range of about 20-70° (e.g., 45°). The mirror block 376 is adhered/fused to the V-groove block 370 along the beveled edge 380.

The mirror block 376 includes a micro-mirror 378 that can implement the micro-mirror 66 of FIG. 1 and/or the micro-mirror 234 of FIG. 5. The micro-mirror 378 is a concave mirror that could be a spherical mirror, a cylindrical mirror, an ellipsoid mirror, etc. An end of the aligned fiber 372 and a center 384 of the micro-mirror 378 are separated by a distance, D1. In some examples, the distance, D1 can be within a range of about 100 μm to about 1000 μm. The MBSO assembly 352 is affixed to a substrate 386, such as a silicon carbon (SiC) substrate. The substrate 386 could be a component of the IC chip 364. The substrate 386 has an anti-reflective coating 388 on a first surface 390 that allows light to pass through. A target region 384 is affixed or integrated with a second surface 394 that opposes the first surface 390 of the substrate 386. A distance, D2 separates the target region 394 from the center 384 of the micro-mirror. In some examples, the distance D2 can be within a range of about 100 μm to about 1000 μm. The MBSO assembly 352 is mounted such that the aligned fiber 372 extends substantially parallel to planes defines by the first surface 390 and the second surface 392 of the substrate 386. Additionally, the MBSO assembly is mounted such that the micro-mirror 378 overlays the target region 394.

The mirror block 376 and the V-groove block 370 are aligned at the given angle, θ. Therefore, an imaginary line extending normal from the center 384 of the micro-mirror 378 and an imaginary line extending along a center of the aligned fiber 372 are separated by the given angle, θ. That is, the angle of the beveled edge 380 also defines the angle of alignment between the micro-mirror 378 and the aligned fiber 372.

In operation, to transmit light from the aligned fiber 372 to the target region 394, a light beam 396 is transmitted from an end of the aligned fiber 372 that faces the micro-mirror 378. The light is reflected by the micro-mirror 66 at an angle of about twice the given angle, θ. Thus, in an example where the given angle is about 45 degrees, the light is reflected at an angle of about 90 degrees. Moreover, as described herein, the micro-mirror 378 transforms the light beam to form a light beam 398 with an ellipsoidal or double bulbous shape. The light beam 398 is transmitted through the substrate 386 onto the target region 394.

Additionally, to transmit light from the target region to the aligned fiber 372, the light beam 398 is transmitted to the micro-mirror 378, which transforms the light beam 398 to form the light beam 396 that is transmitted to the end of the aligned fiber 372. In this manner, the MBSO assembly 352 allows bi-directional communication.

By employment of the MBSO assembly 352, alignment in the optical system 350 is simplified. In particular, the MBSO assembly 352 aligns light beams between the fiber optic cable 356 and the target region 394. Furthermore, the distances D1, D2 and the given angle, θ can be selected to provide a particular beam profile, such as the light beam profiles 140 of FIG. 4 and/or the light beam profile 290 of FIG. 8. Furthermore, as noted the MBSO assembly 352 can be formed with non-metal materials (e.g., dielectrics). Thus, the MBSO assembly 352 can be deployed in relatively close proximity to other circuit components with minimal electrical disturbance. Additionally, since the MBSO assembly 352 can be formed with minimal components, namely the mirror block 376, the V-groove block 370 and the aligned fiber 372, mass production of the MBSO ASSEMBLY 352 is relatively efficient.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. An optical system comprising:
   an aligned fiber in optical communication with an optical medium;
   a micro-mirror separated from an end of the aligned fiber by a first distance, the micro-mirror being positioned and shaped to transform light transmitted between the end of the aligned fiber and a target region of an integrated circuit (IC) chip from a first beam profile to a second beam profile, wherein the micro-mirror is separated from the target region by a second distance and transforms an aspect ratio of the first beam profile of the light to form the second beam profile of the light; and
   a micro beam shaping optics (MBSO) assembly housing the aligned fiber and the micro-mirror, wherein the MBSO assembly is configured to be positioned proximate to the IC chip and to guide the light between the micro-mirror and the target region of the IC chip.

2. The optical system of claim 1, wherein the aligned fiber comprises a single mode fiber.

3. The optical system of claim 2, wherein a light beam between the end of the aligned fiber and the micro-mirror has a profile with a substantially circular shape, wherein a center of the profile has a highest light intensity.

4. The optical system of claim 3, wherein a light beam transmitted between the micro-mirror and the target region has a profile with a substantially ellipsoidal shape.

5. The optical system of claim 4, wherein the substantially ellipsoidal shape has a length to width ratio of at least 20 to 1.

6. The optical system of claim 3, wherein the light beam transmitted between the micro-mirror and the target region has a footprint of about 1 micrometer by about 30 micrometers near the target region.

7. The optical system of claim 1, wherein the transforming varies as a function of a given angle between an imaginary line extending normal from a center of the micro-mirror and an imaginary line extending from a center of the aligned fiber.

8. The optical system of claim 7, wherein the given angle is between about 20 degrees and about 70 degrees.

9. The optical system of claim 1, wherein the aligned fiber comprises:
   a single mode fiber portion; and
   a multi-mode fiber portion, wherein the multi-mode fiber portion is positioned at the end of the aligned fiber proximal to the micro-mirror.

10. The optical system of claim 9, wherein a light beam between the end of the aligned fiber and the micro-mirror has a profile with a ring shaped portion, wherein the ring shaped portion has a greater light intensity than a center of the ring shaped portion.

11. The optical system of claim 10, wherein a light beam at the micro-mirror has a profile with a crescent shaped portion with a greatest light intensity.

12. The optical system of claim 9, wherein a light beam transmitted between the micro-mirror and the target region has a profile with a substantially double bulbous shape, wherein a center of each bulbous of the double bulbous shape has a greatest light intensity.

13. The optical system of claim 12, wherein the substantially double bulbous shape has a length to width ratio of at least 20 to 1.

14. A micro-beam shaping optics (MBSO) assembly comprising:
   a V-groove block comprising:
      a V-shaped groove extending along a first surface of the V-groove block;
      a beveled edge that extends between the first surface and a second surface at a given angle, wherein an aligned fiber extends through a portion of the V-shaped groove; and
   a mirror block adhered to the beveled edge of the V-groove block, the mirror block comprising:
      a micro-mirror spaced from an end of the aligned fiber by a first distance, wherein the given angle separates an imaginary line extending normal to a center of the micro-mirror and an imaginary line that extends along a center of the aligned fiber;
   wherein the MBSO assembly is configured to such that the micro-mirror overlays a target region of an integrated circuit (IC) chip and the micro-mirror transforms and reflects signals transmitted between the aligned fiber and the target region.

15. The MBSO assembly of claim 14, wherein the transforming is based on the given angle, a distance between the aligned fiber and the micro-mirror and a distance between the micro-mirror and the target region.

16. The MBSO assembly of claim 14, wherein the aligned fiber comprises a multi-mode fiber portion affixed at an end of the aligned fiber that is proximal to the micro-mirror.

17. An optical system comprising:
   a fiber optic cable;
   an integrated circuit (IC) chip with a target region; and
   a micro beam shaping optics (MBSO) assembly affixed to a surface of the IC chip, the MBSO comprising:
      an aligned fiber that extends substantially in parallel to the surface of the IC chip and the aligned fiber being optically coupled to the fiber optic cable, wherein the MBSO changes at least a length to width ratio of optical signals transmitted between the fiber optic cable and the target region of the IC chip.

18. The optical system of claim 17, wherein the MBSO further comprises:
   a micro-mirror being spaced apart from the aligned fiber by a first distance and being spaced apart from the target region by a second distance, wherein the length to width ratio is based on the first and second distances.

* * * * *